United States Patent
Erickson

(10) Patent No.: US 10,129,587 B2
(45) Date of Patent: *Nov. 13, 2018

(54) FAST SWITCHING OF SYNCHRONIZED MEDIA USING TIME-STAMP MANAGEMENT

(71) Applicant: AVAGO TECHNOLOGIES INTERNATIONAL SALES PTE LIMITED, Singapore (SG)

(72) Inventor: David Erickson, San Clemente, CA (US)

(73) Assignee: AVAGO TECHNOLOGIES INTERNATIONAL SALES PTE. LIMITED, Singapre (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,405

(22) Filed: Oct. 5, 2015

(65) Prior Publication Data

US 2016/0029075 A1    Jan. 28, 2016

Related U.S. Application Data

(63) Continuation of application No. 13/676,555, filed on Nov. 14, 2012, now Pat. No. 9,154,834.

(Continued)

(51) Int. Cl.
| | |
|---|---|
| *H04N 21/434* | (2011.01) |
| *H04N 21/44* | (2011.01) |
| *H04N 21/439* | (2011.01) |
| *H04N 19/44* | (2014.01) |
| *G11B 20/00* | (2006.01) |

(Continued)

(52) U.S. Cl.
CPC ... *H04N 21/4341* (2013.01); *G11B 20/00007* (2013.01); *G11B 27/322* (2013.01); *H04N 19/44* (2014.11); *H04N 21/4307* (2013.01); *H04N 21/439* (2013.01); *H04N 21/4347* (2013.01); *H04N 21/44016* (2013.01)

(58) Field of Classification Search
CPC .......... H04N 21/4307; H04N 21/4341; H04N 21/4347; H04N 21/439; H04N 19/44; H04N 21/44016; G11B 27/322; G11B 20/00007

See application file for complete search history.

(56) References Cited

U.S. PATENT DOCUMENTS

| | | | |
|---|---|---|---|
| 6,233,253 B1 * | 5/2001 | Settle | H04N 21/2365 370/474 |
| 6,775,842 B1 | 8/2004 | Van Gestel | |

(Continued)

OTHER PUBLICATIONS

U.S. Appl. No. 12/874,424, filed Sep. 2, 2010, Pelts.

(Continued)

*Primary Examiner* — Mohammed Jebari
(74) *Attorney, Agent, or Firm* — Foley & Lardner LLP

(57) ABSTRACT

Disclosed are various embodiments that facilitate fast switching of synchronized media using time-stamp management. A first media stream and multiple second media streams are obtained. The second media stream is time synchronized to the first media stream. The first media stream and one of the second media streams are decoded. Time-stamp management without decoding is performed for another one of the second media streams to facilitate fast switching to the other one of the second media streams when desired.

16 Claims, 6 Drawing Sheets

Related U.S. Application Data

(60) Provisional application No. 61/723,210, filed on Nov. 6, 2012.

(51) Int. Cl.
*H04N 21/43* (2011.01)
*G11B 27/32* (2006.01)

(56) References Cited

U.S. PATENT DOCUMENTS

| | | |
|---|---|---|
| 2006/0133251 A1 | 6/2006 | Thangaraj et al. |
| 2007/0041279 A1 | 2/2007 | Kim et al. |
| 2007/0109444 A1* | 5/2007 | Uchida ............. H04N 21/2368 348/515 |
| 2008/0037151 A1* | 2/2008 | Fujimoto ............. G11B 20/10 360/18 |
| 2008/0101404 A1* | 5/2008 | Ross ................ H04N 21/23406 370/465 |
| 2010/0329354 A1 | 12/2010 | Kellerman et al. |

OTHER PUBLICATIONS

U.S. Appl. No. 61/360,843, filed Jul. 1, 2010, Pelts.
U.S. Appl. No. 12/189,022, filed Aug. 8, 2008, Wan.
U.S. Appl. No. 12/105,127, filed Apr. 17, 2008, Wan.
U.S. Appl. No. 10/926,374, filed Aug. 25, 2004, MacInnis.
Preinterview first office action for U.S. Appl. No. 13/676,555 dated Dec. 19, 2014.
Notice of Allowance for U.S. Appl. No. 13/676,555 dated Jun. 8, 2015.

* cited by examiner

FAST SWITCHING OF SYNCHRONIZED MEDIA USING TIME-STAMP MANAGEMENT

CROSS-REFERENCE TO RELATED APPLICATIONS

This application claims priority as a continuation to, and the benefit of, U.S. Non-provisional Application No. 13/676,555, entitled "FAST SWITCHING OF SYNCHRONIZED MEDIA USING TIME-STAMP MANAGEMENT," and filed on Nov. 14, 2012, issued as U.S. Pat. No. 9,154,834 on Oct. 6, 2015; which claims priority to U.S. Provisional Application No. 61/723,210 entitled "FAST SWITCHING OF SYNCHRONIZED MEDIA USING TIME-STAMP MANAGEMENT" and filed on Nov. 6, 2012, each of which is incorporated by reference in its entirety.

BACKGROUND

Video content such as movies, television programming, and so on may be associated with multiple alternative audio tracks. In one example, alternative audio tracks for different languages may be provided. In another example, a primary audio track for a movie may correspond to scene dialogue, while a secondary audio track for the movie may correspond to a director's commentary. The audio tracks are typically time synchronized to the video content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
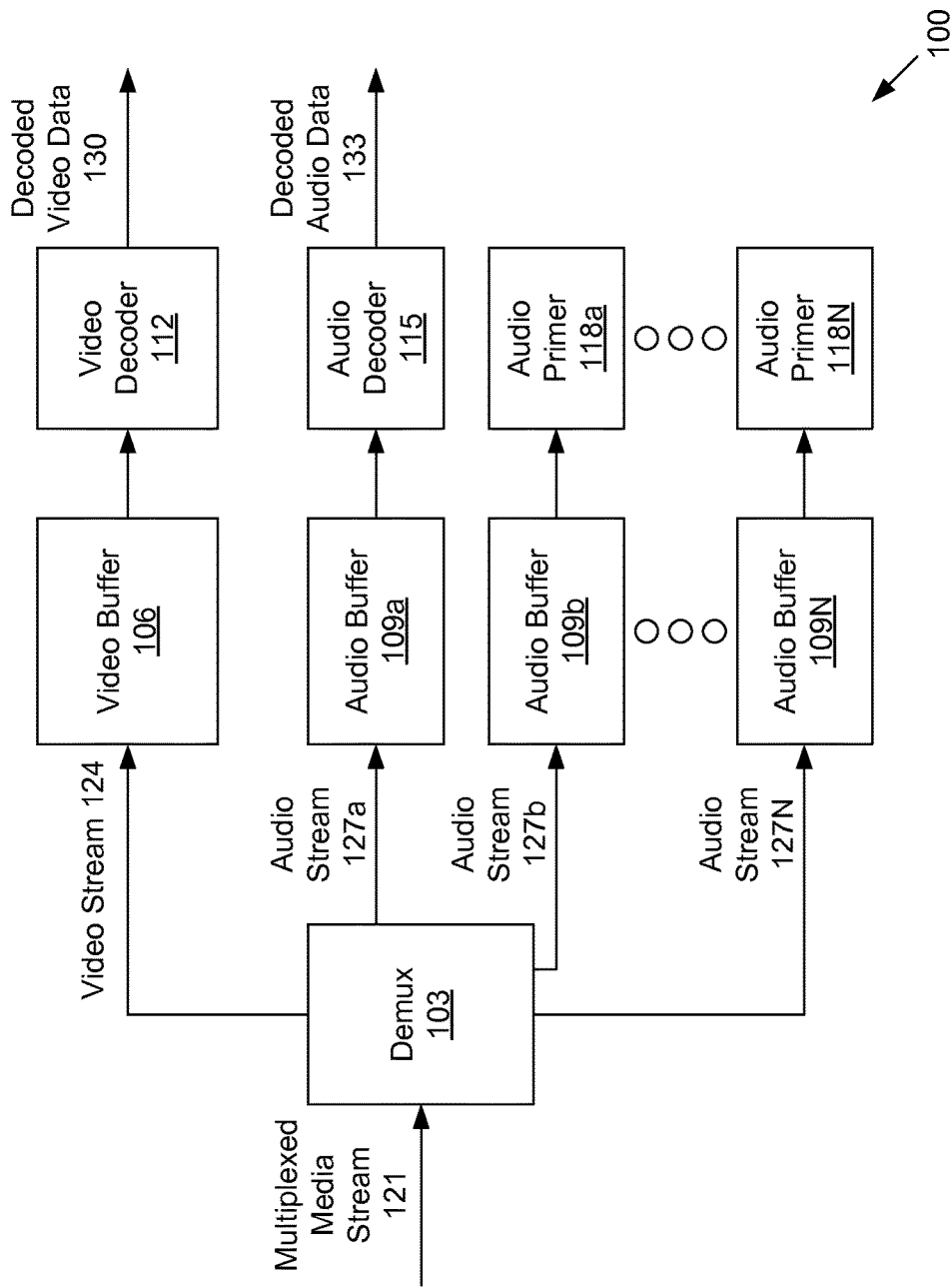
FIG. 1 depicts an exemplary video decoding system according to various embodiments of the present disclosure.

The present disclosure relates to techniques to enable fast switching of synchronized media using time-stamp management. In playing back a recorded media stream, deep pipelining of the decode process may be desired. For example, when playing back media content through Internet-based streaming, a relatively large buffer might be desired to insulate the playback process from network-caused errors and delays. A relatively large buffer may be desired to insulate the playback process when reading recorded media content from optical discs, hard drives, network-attached storage, and other sources. By contrast, relatively large buffers may not be available for the decoding of live streams because filing such buffers may involve stopping playback.

Deep pipelining and buffering may cause problems in the context of switching playback of audio tracks or streams. As an example, video content may be associated with multiple audio tracks synchronized to the video content. Such audio tracks may correspond to different languages or other alternative audio content. As another example, picture-in-picture video content may be associated with multiple audio tracks, with one or more audio tracks per video stream included in the picture-in-picture video content.

When switching between multiple audio tracks, it is desirable not to interrupt or glitch the video content. However, it may be the case that an audio decode is not available for each audio track. In order to switch between the audio tracks without disrupting the video, the audio decoder may be stopped, with all the data in the corresponding audio buffer being lost. With deep pipelining and relatively large buffers, there may be a noticeable delay (e.g., 2-3 seconds or another amount) when starting the new audio track because the audio decoder may have to wait for the audio buffer to fill again so that the audio may be synchronized with the video.

In particular, the audio decoder may wait until a presentation time stamp (PTS) in the audio data matches a system time clock (STC) used by the video. The amount of delay may correspond to the time represented by data in a video buffer. A delay may be perceived for both live and playback streams, but the delay may be more pronounced for playback streams due to the increased buffering.

Various embodiments of the present disclosure employ corresponding primers for multiple synchronized audio streams where not enough audio decoders are available. The primers facilitate time-stamp management for undecoded audio streams so that noticeable delay does not result from restarting the decoder after the currently decoded audio track is switched. Primers may be less expensive to implement than full decoder logic. Examples of techniques related to using primers to enable fast switching among multiple unsynchronized video streams are described by U.S. patent application Ser. No. 12/874,424 entitled "METHOD AND SYSTEM FOR FAST DIGITAL CHANNEL CHANGE UTILIZING TIME-STAMP MANAGEMENT" and filed on Sep. 2, 2010, which is incorporated herein in its entirety. In the following discussion, a general description of the system and its components is provided, followed by a discussion of the operation of the same.

FIG. 1 depicts an exemplary video decoding system 100 according to various embodiments of the present disclosure. The video decoding system 100 includes a demux 103, a video buffer 106, a plurality of audio buffers 109a, 109b . . . 109N, a video decoder 112, an audio decoder 115, a plurality of audio primers 118a . . . 118N, and potentially other components. The demux 103 is configured to obtain a multiplexed media stream 121 such as, for example, a Moving Pictures Experts Group (MPEG) transport stream or program stream, an advanced systems format (ASF) stream, an audio video interleaved (AVI) stream, or other media streams. The multiplexed media stream 121 may include multiple elementary streams such as, for example, a video stream 124, a plurality of audio streams 127a, 127b . . . 127N, subtitle streams, and other streams that are synchronized to the video stream 124.

The demux 103 is configured to demultiplex the various streams included in the multiplexed media streams 121 and to provide the included streams to various buffers such as the video buffer 106, the audio buffers 109, and potentially other buffers. The audio buffers 109, in particular, may be located in a shared memory. The video buffer 106 and audio buffers 109 may correspond to first-in-first-out (FIFO) buffers. The video stream 124 is provided to the video buffer 106, and each of the respective audio streams 127 are provided to a corresponding audio buffer 109. The video decoder 112 is configured to read from the video buffer 106 and to generate decoded video data 130. The audio decoder 115 is configured to read from the audio buffer 109a and to generate decoded audio data 133. The video decoder 112 and/or audio decoder 115 may correspond to specialized processing circuitry that implements video decoding or audio decoding, respectively. It is understood that both the video decoder 112 and the audio decoder 115 may perform time-stamp management functions, security functions, etc. as part of the decoding process.

The audio primers 118 are configured to prime or prepare an audio stream 127 for immediate decoding. To this end, the audio primers 118 are configured to consume data from a respective audio buffer 109 and perform time-stamp management functions, security functions (e.g., digital rights management functions, decryption functions, etc.), capture of user data (e.g., for closed captioning, subtitles, etc.), and/or other functions. For example, the audio primers 118 may consume the audio data from the respective audio buffer 109 such that the next audio frame to be read from the respective audio buffer 109 has a PTS which closely matches the current STC for the video. In various embodiments, the audio primers 118 are not capable of decoding. After performing time-stamp management or other non-decoding functions, the audio primers 118 may be configured simply to discard or overwrite the consumed data. The audio primers 118 may be implemented by software executed by a host processor such that a dynamic number of audio primers 118 may be employed depending on the multiplexed media stream 121 to be processed.

Next, a general description of the operation of the various components of the video decoding system 100 is provided. A multiplexed media stream 121 arrives at the demux 103. The demux 103 demultiplexes the multiplexed media stream 121 into a video stream 124 and a plurality of audio streams 127, where one or more of the audio streams 127 are selected for decoding (e.g., audio stream 127a).

In an exemplary embodiment, the demux 103 may be operable to recover a clock for decoding the multiplexed media stream 121 at a desired rate. In this regard, the demux 103 may be operable to determine a program clock reference (PCR) rate specifically for the current multiplexed media stream 121 based on a corresponding PCR value. A PCR rate is a sample rate indicating the number of times per second the PCR may appear in the received multiplexed media stream 121. The determined PCR rate may be provided as a timebase or a reference clock to the video decoder 112 and/or audio decoder 115 for decoding the multiplexed media stream 121 at the right rate.

In one embodiment, an audio stream 127 includes one or more channels, e.g., mono, stereo, surround sound, and so on. In another embodiment, one audio stream 127 may correspond to one channel, while another audio stream 127 may correspond to another channel. Accordingly, a subset of the audio streams 127 including multiple audio streams 127 may be selected for concurrent decoding.

The demux 103 stores the video stream 124 in the video buffer 106, and the video decoder 112 reads the video stream 124 from the video buffer 106. The video decoder 112 then decodes the video data to produce the decoded video data 130. In doing so, the video decoder 112 employs a STC for time-stamp management of decoding. In a live mode, the STC may be obtained from a PCR in the multiplexed media stream 121 or the video stream 124. In a playback mode, the STC may be obtained from the first PTS (or another PTS, as desired) returned by either the video decoder 112 or the audio decoder 115. The decoded video data 130 may then be rendered on a display device.

The demux 103 stores the audio streams 127 in corresponding audio buffers 109. The audio decoder 115 reads in the audio stream 127a from the audio buffer 109a. The audio decoder 115 then decodes the audio data to produce the decoded audio data 133. The decoded audio data 133 may then be rendered by a sound device. The audio decoder 115 performs time-stamp management by comparing a PTS in the audio stream 127 with the current STC. The audio decoder 115 uses the PTS comparison to synchronize the decoding of the audio stream 127a with the decoding of the video stream 124.

If multiple audio decoders 115 are present, the multiple audio decoders 115 may perform decoding of multiple audio streams 127 concurrently. However, there may be more audio streams 127 than audio decoders 115 available. A corresponding audio primer 118 is employed for each of the undecoded audio streams 127. The audio primer 118 consumes data from the respective audio buffer 109 and performs time-stamp management such that the data is consumed from the audio buffer 109 as if it were to be decoded. However, instead of actually decoding the data, the audio primer 118 merely discards or overwrites the data.

To perform time-stamp management, the audio primers 118 may monitor time-stamp differences such as PTS−STC of audio frames in the audio buffers 109. Audio frames may be discarded if PTS≤STC. Audio frames corresponding to PTS>STC may be maintained within associated audio buffers 109. In this regard, audio frames that are ready to be decoded, in the audio buffers 109, for example, may be provided to the audio decoder 115 for immediate decoding and playback if an associated audio stream 127 is selected.

The currently selected audio stream 127 that is decoded may change. For example, a user may request a change to a director's commentary track or an alternative language track. In response to a selection of an audio stream 127b, the decoding of the audio stream 127a is stopped, and decoding of the audio stream 127b is started. In one embodiment, the audio decoder 115 is reconfigured by the video decoding system 100 to read from the audio buffer 109b. In another embodiment, the contents of the audio buffer 109b are copied into the audio buffer 109a.

The data that is ready to be consumed from the audio buffer 109b has already undergone time-stamp management by the audio primer 118a. That is to say, the next data to be consumed by the audio decoder 115 has been correctly synchronized by the audio primer 118a for the video that is being decoded by the video decoder 112. The audio decoder 115 is thus able to continue decoding without noticeable interruption or delay. The video decoder 112 continues decoding unaffected by the audio switch.

Further, the contents of the audio buffer 109a may be transferred to the audio buffer 109b, or the audio primer 118a may be reconfigured to consume from the audio buffer 109a. Accordingly, the audio primer 118a continues consuming data corresponding to the now unselected audio stream 127a. The audio primer 118a performs time-stamp management on this unselected audio stream 127a so that, if the audio stream 127a were selected again, decoding of the audio stream 127a may similarly be resumed without noticeable interruption or delay. It is noted that the audio buffers 109a and 109b may remain unflushed in response to the audio switch.

Figure 2:
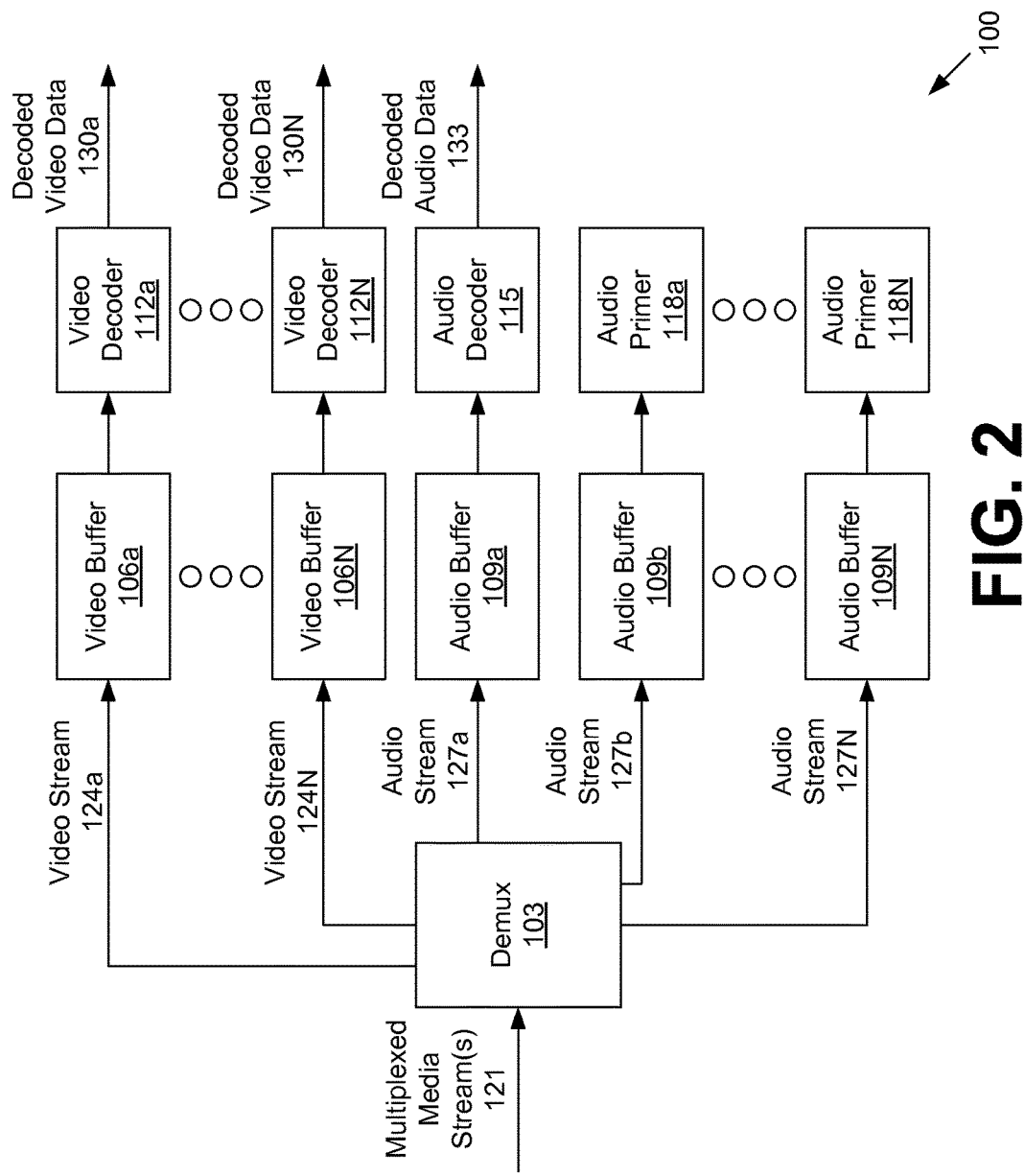
FIG. 2 depicts the exemplary video decoding system of FIG. 1 configured to process multiple video streams according to various embodiments of the present disclosure.

FIG. 2 depicts the exemplary video decoding system 100 (FIG. 1) configured to process multiple video streams 124 according to various embodiments of the present disclosure. In the example of FIG. 2, one or more multiplexed media streams 121 are obtained by the demux 103, where the multiplexed media streams 121 include a plurality of video streams 124a . . . 124N. The video streams 124 may correspond to picture-in-picture video. In some embodiments, the picture-in-picture video may be encoded in a single video stream 124. The video streams 124 are stored in respective video buffers 106a . . . 106N and decoded by respective video decoders 112a . . . 112N to produce corresponding decoded video data 130a . . . 130N.

One or more of the audio streams 127 may correspond to each of the video streams 124a . . . 124N. For example, a first audio stream 127 may correspond to the main channel audio for a first video stream 124, while a second audio stream 127 may correspond to the main channel audio for a second video stream 124. Additionally, a subsequent audio stream 127 may correspond to a secondary audio program for the first video stream 124. The video streams 124 may be associated with a same or different PCR/STC, and the audio streams 127 may include PTS fields that are synchronized to a common time base or to a respective time base for the corresponding video stream 124.

The operation of the video decoding system 100 of FIG. 2 is similar to that of FIG. 1. With picture-in-picture video, it may be the case that only one audio stream 127 is decoded and played out. A user may select among the multiple video streams 124 in the picture-in-picture video, and based on the selection, the corresponding audio stream 127 is decoded and played out. Further, any of the video streams 124 may be associated with multiple audio streams 127, e.g., multiple languages, etc. As previously stated, it is desirable not to glitch or interrupt the video when switching the audio, and it is desirable not to cause noticeable interruption or delay in the audio when switching the audio. As in FIG. 1, one or more audio primers 118 are utilized to perform time-stamp management (using the corresponding STC if applicable) for each of the unselected audio streams 127 to facilitate immediate decoding upon selection.

Figure 3:
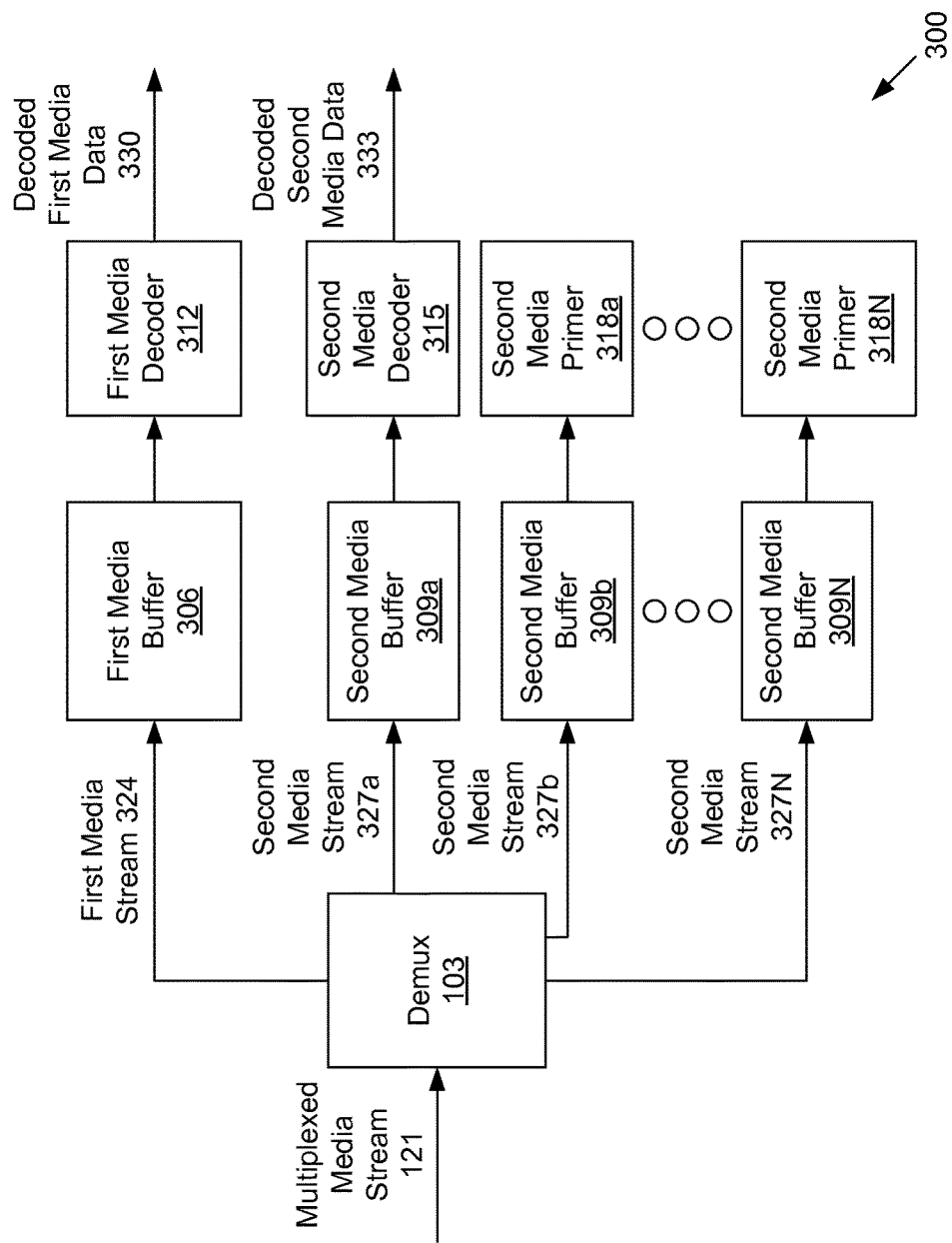
FIG. 3 depicts an exemplary media decoding system corresponding to a generalized version of the exemplary media decoding system of FIG. 1 according to various embodiments of the present disclosure.

FIG. 3 depicts an exemplary media decoding system 300 corresponding to a generalized version of the exemplary video decoding system 100 (FIG. 1) according to various embodiments of the present disclosure. In comparison to FIG. 1, in FIG. 3, video has been generalized to "first media," and audio has been generalized to "second media." The media decoding system 300 includes a first media buffer 306, a plurality of second media buffers 309a, 309b . . . 309N, a first media decoder 312, a second media decoder 315, and a plurality of second media primers 318a . . . 318N.

As in FIG. 1, the demux 103 receives a multiplexed media stream 121. The demux 103 demultiplexes the multiplexed media stream 121 to produce a first media stream 324, which is stored in the first media buffer 306, and a plurality of second media streams 327a, 327b . . . 327N, which are stored in the second media buffers 309. The first media decoder 312 consumes data from the first media buffer 306 and decodes it to generate decoded first media data 330. The second media decoder 315 consumes data from the second media buffer 309a and decodes it to generate decoded second media data 333. The second media primers 318 are configured to consume data from the respective second media buffers 309 to perform time-stamp management functions, security functions, etc. without actually decoding the second media streams 327. The second media primers 318 are employed to facilitate immediate decoding in response to a selection.

The second media streams 327 may be time synchronized to the first media stream 324. As a non-limiting example, the first media stream 324 may correspond to an audio stream associated with an event, and the second media streams 327 may correspond to multiple video streams associated with the event, where only a subset of the video streams are selected for decoding. Such an event may be a sporting event or another type of event. As another non-limiting example, the second media streams 327 may correspond to alternative subtitle streams synchronized to the first media stream 324, where the first media stream 324 may correspond to audio and/or video.

The currently selected second media stream 327 that is decoded may change. In response to a selection of a second media stream 327b, the decoding of the second media stream 327a is stopped, and decoding of the second media stream 327b is started. In one embodiment, the second media decoder 315 is reconfigured by the media decoding system 300 to read from the second media buffer 309b. In another embodiment, the contents of the second media buffer 309b are copied into the second media buffer 309a.

The data that is ready to be consumed from the second media buffer 309b has already undergone time-stamp management by the second media primer 318a. That is to say, the next data to be consumed by the second media decoder 315 has been correctly synchronized by the second media primer 318a for the first media that is being decoded by the first media decoder 312. The second media decoder 315 is thus able to continue decoding without noticeable interruption or delay. The first media decoder 312 continues decoding unaffected by the second media switch.

Figure 4:
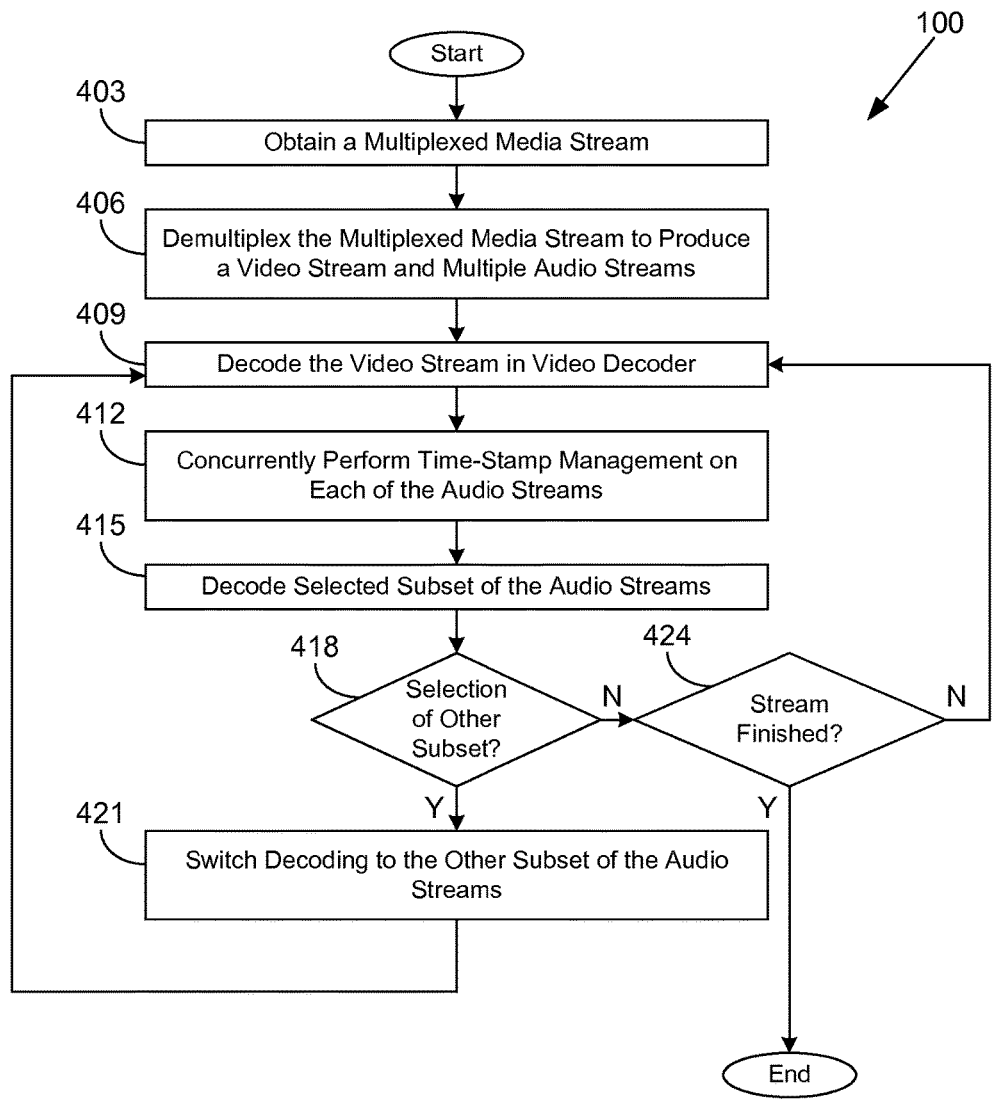
FIG. 4 depicts an exemplary flowchart that provides one example of the operation of the exemplary video decoding system of FIG. 1 according to various embodiments.

FIG. 4 depicts an exemplary flowchart that provides one example of the operation of the exemplary video decoding system 100 (FIG. 1) according to various embodiments. It is understood that the flowchart of FIG. 4 provides merely an example of the many different types of functional arrangements that may be employed to implement the operation of the video decoding system 100 as described herein. As an alternative, the flowchart of FIG. 4 may be viewed as depicting an example of steps of a method implemented in the video decoding system 100 according to one or more embodiments.

Beginning with reference number 403, the video decoding system 100 obtains a multiplexed media stream 121 (FIG. 1). At reference number 406, the video decoding system 100 demultiplexes the multiplexed media stream 121 to produce one or more video streams 124 (FIG. 1) and multiple audio streams 127 (FIG. 1). The audio streams 127 may be time synchronized to the video stream 124 through the use of PTS values and an STC. It may be the case that at least some of the audio streams 127 correspond to different bitrates.

At reference number 409, the video decoding system 100 decodes the video stream 124 in the video decoder 112 (FIG. 1), thereby producing decoded video data 130 (FIG. 1). At reference number 412, the video decoding system 100 concurrently performs time-stamp management functions on each of the audio streams 127. To this end, the time-stamp management functions may be performed by audio decoders 115 (FIG. 1) for a currently selected subset of the audio streams 127. The time-stamp management functions may be performed by audio primers 118 (FIG. 1) for a non-selected subset of the audio streams 127 that are not being decoded. The time-stamp management functions may include performing frame synchronization for the audio streams 127 and matching PTS values in the audio streams 127 with a clock reference associated with the video stream 124.

At reference number 415, the video decoding system 100 decodes the selected subset of the audio streams 127 in the audio decoder(s) 115, thereby producing decoded audio data 133 (FIG. 1). At least one of the audio streams 127 may be excluded from the selected subset and remain undecoded after being consumed by the audio primer(s) 118 (FIG. 1). At reference number 418, the video decoding system 100 determines whether another subset of the audio streams 127 has been selected.

If another subset has been selected, the video decoding system 100 moves to reference number 421 and switches the decoding performed by the audio decoder(s) 115 to the other subset of the audio streams 127. To this end, the video decoding system 100 may cease decoding of the currently selected audio streams 127, commence decoding of the other audio streams 127 using a portion of the audio streams 127 stored prior to the selection in a time-stamp management buffer (e.g., audio buffers 109b . . . 109N). Subsequently, time-stamp management without decoding may be performed for the newly non-selected audio streams 127. The video decoding system 100 returns to reference number 409 and continues decoding of the video stream 124.

If, instead, no other subset of audio streams 127 is selected in reference number 418, the video decoding system 100 instead moves to reference number 424 and determines whether the multiplexed media stream 121 has finished. If the multiplexed media stream 121 has not finished, the video decoding system 100 returns to reference number 409 and continues decoding the video stream 124. If the multiplexed media stream 121 has finished, the portion of the video decoding system 100 ends.

Figure 5:
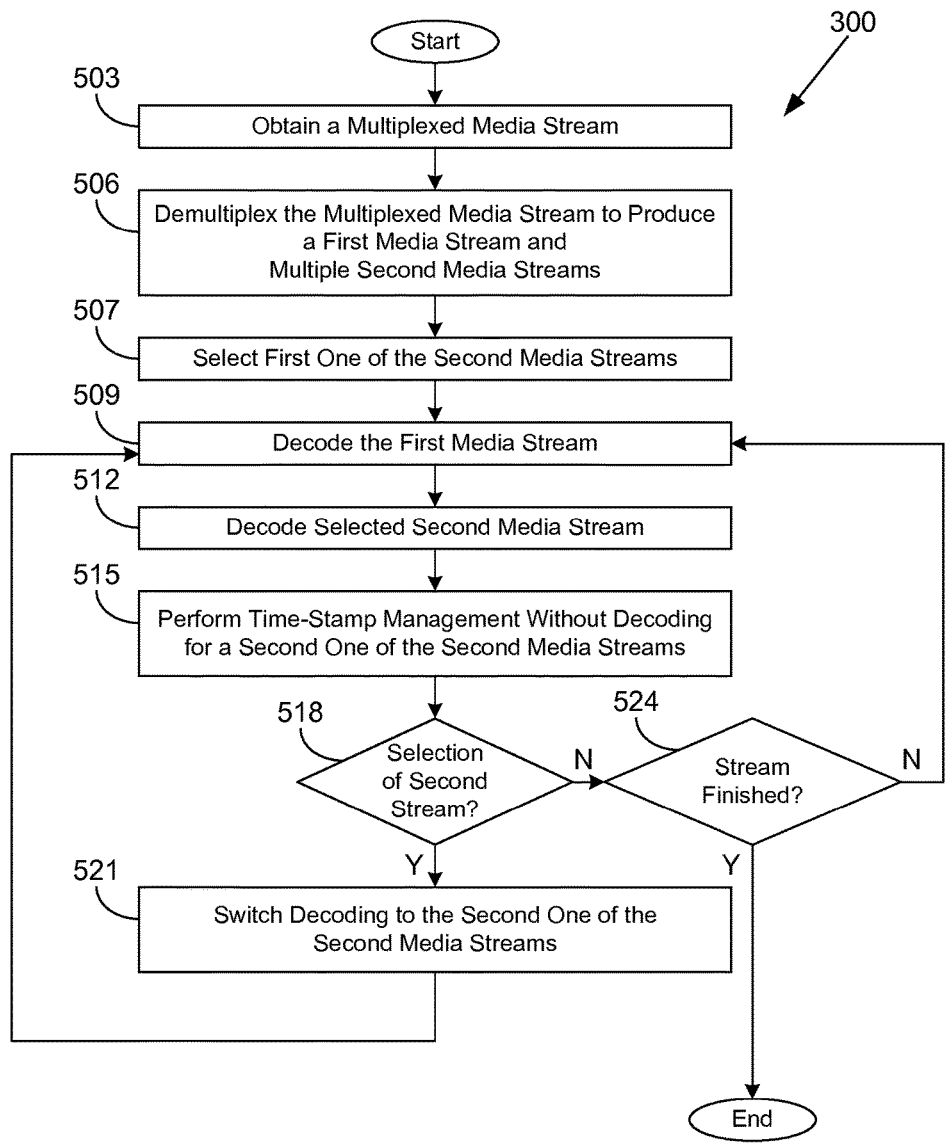
FIG. 5 depicts an exemplary flowchart that provides one example of the operation of the exemplary media decoding system of FIG. 3 according to various embodiments.

FIG. 5 depicts an exemplary flowchart that provides one example of the operation of the exemplary media decoding system 300 (FIG. 3) according to various embodiments. It is understood that the flowchart of FIG. 5 provides merely an example of the many different types of functional arrangements that may be employed to implement the operation of the media decoding system 300 as described herein. As an alternative, the flowchart of FIG. 5 may be viewed as depicting an example of steps of a method implemented in the media decoding system 300 according to one or more embodiments.

Beginning with reference number 503, the media decoding system 300 obtains a multiplexed media stream 121 (FIG. 3). At reference number 506, the media decoding system 300 demultiplexes the multiplexed media stream 121 to produce one or more first media streams 324 (FIG. 3) and multiple second media streams 327 (FIG. 3). The second media streams 327 may be time synchronized to the first media stream 324 through the use of PTS values and an STC. It may be the case that at least some of the second media streams 327 correspond to different bitrates.

At reference number 507, the media decoding system 300 selects a first one of the second media streams 327. At reference number 509, the media decoding system 300 decodes the first media stream 324 in the first media decoder 312 (FIG. 3), thereby producing decoded first media data 330 (FIG. 3). At reference number 512, the media decoding system 300 decodes the selected second media stream 327. At reference number 515, the media decoding system 300 performs time-stamp management functions without decoding for a second one of the second media streams 327. The time-stamp management functions may include performing frame synchronization for the second media streams 327 and matching PTS values in the second media streams 327 with a clock reference associated with the first media stream 324.

At reference number 518, the media decoding system 300 determines whether a selection of the second one of the second media streams 327 has been received. If a selection of the second one of the second media streams 327 has been received, the media decoding system 300 moves to reference number 521 and switches the decoding performed by the second media decoder(s) 315 (FIG. 3) to the second one of the second media streams 327. To this end, the media decoding system 300 may cease decoding of the first one of the second media streams 327, commence decoding of the second one of the second media streams 327 using a portion of the second one of the second media streams 327 stored prior to the selection in a time-stamp management buffer (e.g., second media buffers 309b . . . 309N). Subsequently, time-stamp management without decoding may be performed for the first one of the second media streams 327. The media decoding system 300 returns to reference number 509 and continues decoding of the first media stream 324.

If, instead, no selection is received in reference number 518, the media decoding system 300 instead moves to reference number 524 and determines whether the multiplexed media stream 121 has finished. If the multiplexed media stream 121 has not finished, the media decoding system 300 returns to reference number 509 and continues decoding the first media stream 324. If the multiplexed media stream 121 has finished, the portion of the media decoding system 300 ends.

Figure 6:
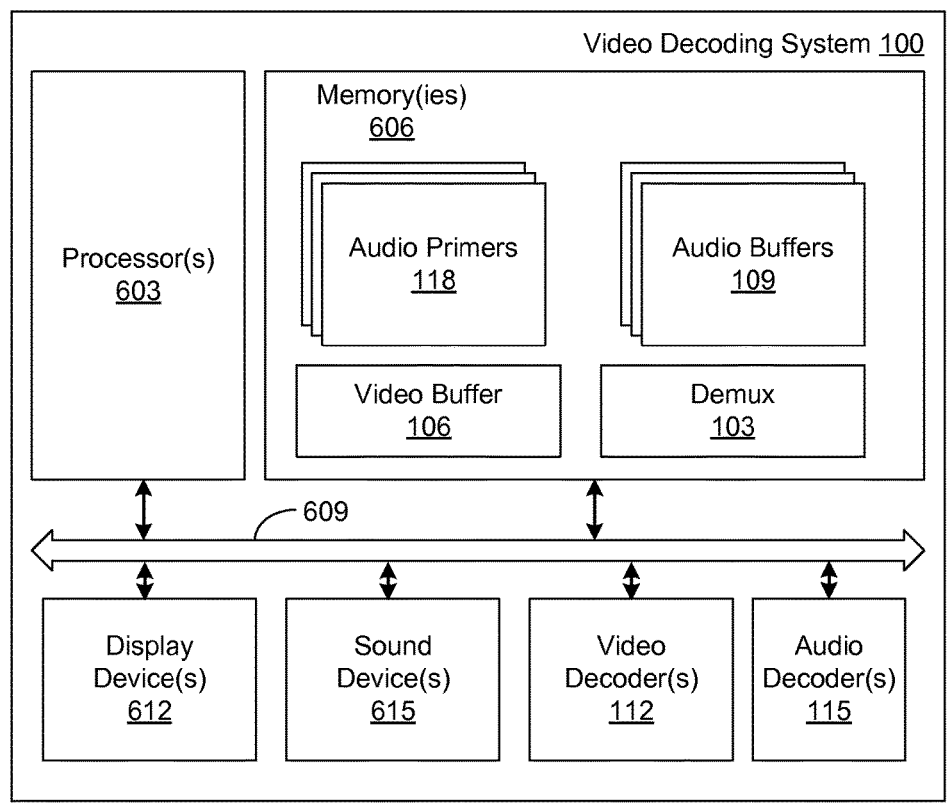
FIG. 6 is an exemplary schematic block diagram that provides another example illustration of the exemplary video decoding system of FIG. 1 according to various embodiments of the present disclosure.

FIG. 6 is an exemplary schematic block diagram that provides another example illustration of the exemplary video decoding system 100 (FIG. 1) according to various embodiments of the present disclosure. The video decoding system 100 includes at least one processor circuit, for example, having one or more processors 603 and a memory 606, both of which are coupled to a local interface 609. The local interface 609 may comprise, for example, a data bus with an accompanying address/control bus or other bus structure as can be appreciated. One or more video decoders 112, one or more audio decoders 115, one or more display devices 612, and one or more sound devices 615 may be coupled to the local interface 609.

Stored in the memory 606 are both data and several components that are executable by the processor 603. In particular, stored in the memory 606 and executable by the processor 603 are the audio primers 118, the demux 103, and potentially other applications. Also stored in the memory 606 may be the video buffer 106, the audio buffers 109, and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the audio primers 118, the demux 103, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the exemplary video decoding system 100 and the exemplary media decoding system 300 (FIG. 3). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the audio primers 118 and the demux 103, that comprises software or code can be embodied in any computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. In some embodiments, the computer-readable medium can comprise transitory propagation media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
processing circuitry configured to:
obtain a video stream associated with a plurality of audio streams, the audio streams being time synchronized to the video stream;
decode the video stream; and
while the video stream is being continuously decoded:
concurrently perform time-stamp management on each of the audio streams;
decode portions of a selected subset of the audio streams having a first presentation time stamp, with portions of at least one of the audio streams having the first presentation time stamp being excluded from the selected subset and remaining undecoded; and
discard, from a buffer, the portions having the first presentation time stamp of the at least one of the audio streams that remain undecoded;
obtain a selection of a second subset of the audio streams; and
switch decoding from the selected subset to the second subset by:
decoding a first portion of the selected subset of the audio streams having a second presentation time stamp, and discarding without decoding a first portion of the second subset of the audio streams having the second presentation time stamp, each of the first portion of the selected subset of the audio streams and the first portion of the second subset of the audio streams synchronized to a first portion of the video stream, and
decoding a second portion of the second subset of the audio streams having a third presentation time stamp subsequent to the second presentation time stamp, and discarding without decoding a second portion of the selected subset of the audio streams having the second presentation time stamp, each of the second portion of the selected subset of the audio streams and the second portion of the second subset of the audio streams synchronized to a second portion of the video stream.

2. The system of claim 1, wherein a first audio stream of the selected subset of the audio streams is at a first bitrate and a second audio stream of the selected subset of the audio streams is at a second, different bitrate.

3. The system of claim 1, wherein the video stream corresponds to a picture-in-picture video stream including a first video stream and a second video stream, a first one of the audio streams corresponds to the first video stream, and a second one of the audio streams corresponds to the second video stream.

4. The system of claim 1, wherein the processing circuitry is further configured to:
obtain a multiplexed media stream; and
demultiplex the multiplexed media stream to produce the video stream and the audio streams.

5. The system of claim 1, wherein the processing circuitry comprises:

an audio decoder configured to perform the time-stamp management for the selected subset of the audio streams and to decode the selected subset of the audio streams; and
an audio primer configured to perform the time-stamp management for the at least one of the audio streams that are excluded from the selected subset and remain undecoded.

6. A system, comprising:
processing circuitry configured to:
obtain a first media stream and a plurality of second media streams, the second media streams being time synchronized to the first media stream;
decode a first portion of the first media stream;
decode a first portion of a first one of the second media streams, the first portion of the first one of the second media streams synchronized to the first portion of the first media stream;
discard, without decoding, a first portion of a second one of the second media streams, the first portion of the second one of the second media streams synchronized to the first portion of the first media stream;
obtain a selection of the second one of the second media streams; and
responsive to the selection:
cease decoding of the first one of the second media streams,
commence decoding of the second one of the second media streams using a portion of the second one of the second media streams stored prior to the selection in a time-stamp management buffer, and
perform time-stamp management without decoding for the first one of the second media streams.

7. The system of claim 6, wherein the processing circuitry is further configured to:
obtain a multiplexed stream; and
demultiplex the multiplexed stream to produce the first media stream and the second media streams.

8. The system of claim 6, wherein the first media stream corresponds to a video stream, and the second media streams correspond to subtitle streams.

9. The system of claim 6, wherein the first media stream corresponds to an audio stream, and the second media streams correspond to video streams.

10. The system of claim 6, wherein the first media stream corresponds to a picture-in-picture video stream.

11. The system of claim 6, wherein the processing circuitry is further configured to match presentation time stamps (PTS) for the second one of the second media streams with a clock reference associated with the first media stream.

12. A method, comprising:
obtaining, by processing circuitry, a first media stream and a plurality of second media streams, the second media streams being time synchronized to the first media stream, the second media streams stored in a corresponding plurality of buffers;
decoding, by a first decoder in the processing circuitry, the first media stream;
decoding, by a second decoder in the processing circuitry, a first one of the second media streams by extracting a first portion of the first one of the second media streams from a first buffer having a time stamp corresponding to a time stamp of the first media stream, and decoding the extracted first portion of the first one of the second media streams;

performing, by a primer in the processing circuitry, time-stamp management for a second one of the second media streams by extracting a first portion of the second one of the second media streams from a second buffer having a time stamp corresponding to the time stamp of the first media stream, and discarding the extracted first portion of the second one of the second media streams;

obtaining, by the processing circuitry, a selection of the second one of the second media streams;

stopping, by the second decoder, decoding of the first one of the second media streams, responsive to the selection;

transferring contents of the second buffer from the primer to the first buffer of the second decoder, responsive to the selection;

starting, by the second decoder, decoding of the second one of the second media streams using the contents of the first buffer, responsive to the selection; and performing, by the primer, time-stamp management for the first one of the second media streams, responsive to the selection.

13. The method of claim 12, further comprising performing, by the primer, security operations for the second one of the second media streams.

14. The method of claim 12, further comprising performing, by the second decoder, time-stamp management for the first one of the second media streams.

15. The method of claim 12, further comprising demultiplexing, by the processing circuitry, a multiplexed transport stream to produce the first media stream and the second media streams.

16. The method of claim 12, wherein the first media stream corresponds to a picture-in-picture video stream including a first video stream and a second video stream, the first one of the second media streams corresponds to an audio stream for the first video stream, and the second one of the second media streams corresponds to an audio stream for the second video stream.

* * * * *